(12) United States Patent
Sundblad

(10) Patent No.: US 6,443,415 B1
(45) Date of Patent: Sep. 3, 2002

(54) COMPUTER MONITOR ORGANIZER ASSEMBLY

(76) Inventor: Bret R. Sundblad, 3208 Sunrise View, McHenry, IL (US) 60050

( * ) Notice: Subject to any disclaimer, the term of this patent is extended or adjusted under 35 U.S.C. 154(b) by 0 days.

(21) Appl. No.: 09/765,659

(22) Filed: Jan. 22, 2001

(51) Int. Cl.[7] .......................... B41J 11/02; G09F 11/00; B32B 3/02
(52) U.S. Cl. .......................... 248/442.2; 248/918; 40/1; D19/52; 428/81
(58) Field of Search .......................... 248/442.2, 918, 248/447.1, 450, 453, 205.2; 428/81, 74, 192, 194, 511, 455, 537.5; D19/52; 40/1

(56) References Cited

U.S. PATENT DOCUMENTS

| | | | |
|---|---|---|---|
| 1,494,583 A | * | 5/1924 | Brooks .......................... 40/611 |
| 4,133,123 A | * | 1/1979 | Anderson .......................... 40/1 |
| 4,877,212 A | * | 10/1989 | Kobayashi .............. 248/444.1 |
| 5,104,087 A | * | 4/1992 | Wentzloff et al. ........ 248/442.2 |
| 5,328,145 A | | 7/1994 | Charapich |
| 5,398,905 A | | 3/1995 | Hinson |
| D367,857 S | | 3/1996 | Emmerik |
| 5,549,267 A | | 8/1996 | Armbruster et al. |
| 5,638,096 A | | 6/1997 | Schwartz |
| 5,658,635 A | * | 8/1997 | Davis et al. .................. 428/81 |
| D392,682 S | | 3/1998 | Johnston et al. |
| 5,743,414 A | * | 4/1998 | Baudino .................... 211/69.1 |
| D396,490 S | * | 7/1998 | Jack ............................ D19/52 |
| D410,250 S | * | 5/1999 | Robertson, Jr. .............. D19/52 |
| 5,987,825 A | * | 11/1999 | Rosen ........................ 52/36.1 |
| 5,988,582 A | * | 11/1999 | Olivo ....................... 248/442.2 |
| D417,701 S | * | 12/1999 | Jack ............................ D19/52 |
| 6,007,891 A | * | 12/1999 | Davis et al. .................. 428/81 |
| 6,250,006 B1 | * | 6/2001 | Berrier ........................ 40/666 |

FOREIGN PATENT DOCUMENTS

GB 2306403 * 7/1997

* cited by examiner

*Primary Examiner*—Anita King

(57) ABSTRACT

A computer monitor organizer assembly for organizing information and implements on a panel couplable to a computer monitor. The computer monitor organizer assembly includes a panel assembly that has a central opening. The panel assembly is adapted for coupling to a computer monitor such that a display screen of the computer monitor is viewable through the central opening. The panel assembly includes a writing board and an eraser. The panel assembly also includes an eraser holder. The eraser holder is for coupling the eraser to the panel assembly. There is also a writing implement and writing implement holder. The writing implement holder is for coupling the writing implement to the panel assembly. Also included is a notepad and a paper holding bracket coupled to the panel assembly. The paper holding bracket is adapted for holding a sheet of paper. There is also a corkboard coupled to the panel assembly.

21 Claims, 4 Drawing Sheets

COMPUTER MONITOR ORGANIZER ASSEMBLY

BACKGROUND OF THE INVENTION

1. Field of the Invention

The present invention relates to computer monitor organizers and more particularly pertains to a new computer monitor organizer assembly for organizing information and implements on a panel couplable to a computer monitor.

2. Description of the Prior Art

The use of computer monitor organizers is known in the prior art. More specifically, computer monitor organizers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,398,905; U.S. Pat. No. 5,328,145; U.S. Pat. No. 5,549,267; U.S. Pat. No. Des. 367,857; U.S. Pat. No. Des. 392,682; and U.S. Pat. No. 5,638,096.

While these devices fulfill their respective, particular objectives and requirements, the aforementioned patents do not disclose a new computer monitor organizer assembly. The inventive device includes a panel assembly that has a central opening. The panel assembly is adapted for coupling to a computer monitor such that a display screen of the computer monitor is viewable through the central opening. The panel assembly includes a writing board and an eraser. The panel assembly also includes an eraser holder for coupling the eraser to the panel assembly. There is also a writing implement and writing implement holder for coupling the writing implement to the panel assembly. Also included is a notepad and a paper holding bracket coupled to the panel assembly. The paper holding bracket is adapted for holding a sheet of paper. There is also a corkboard coupled to the panel assembly.

In these respects, the computer monitor organizer assembly according to the present invention substantially departs from the conventional concepts and designs of the prior art, and in so doing provides an apparatus primarily developed for the purpose of organizing information and implements on a panel couplable to a computer monitor.

SUMMARY OF THE INVENTION

In view of the foregoing disadvantages inherent in the known types of computer monitor organizers now present in the prior art, the present invention provides a new computer monitor organizer assembly construction wherein the same can be utilized for organizing information and implements on a panel couplable to a computer monitor.

The general purpose of the present invention, which will be described subsequently in greater detail, is to provide a new computer monitor organizer assembly apparatus and method which has many of the advantages of the computer monitor organizers mentioned heretofore and many novel features that result in a new computer monitor organizer assembly which is not anticipated, rendered obvious, suggested, or even implied by any of the prior art computer monitor organizers, either alone or in any combination thereof.

To attain this, the present invention generally comprises a panel assembly that has a central opening. The panel assembly is adapted for coupling to a computer monitor such that a display screen of the computer monitor is viewable through the central opening. The panel assembly includes a writing board and an eraser. The panel assembly also includes an eraser holder for coupling the eraser to the panel assembly. There is also a writing implement and writing implement holder for coupling the writing implement to the panel assembly. Also included is a notepad and a paper holding bracket coupled to the panel assembly. The paper holding bracket is adapted for holding a sheet of paper. There is also a corkboard coupled to the panel assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and specially the scientists, engineers and practitioners in the art who are not familiar with patent or, legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new computer monitor organizer assembly apparatus and method which has many of the advantages of the computer monitor organizers mentioned heretofore and many novel features that result in a new computer monitor organizer assembly which is not anticipated, rendered obvious, suggested, or even implied by any of the prior art computer monitor organizers, either alone or in any combination thereof.

It is another object of the present invention to provide a new computer monitor organizer assembly which may be easily and efficiently manufactured and marketed.

It is a further object of the present invention to provide a new computer monitor organizer assembly which is of a durable and reliable construction.

An even further object of the present invention is to provide a new computer monitor organizer assembly which is susceptible of a low cost of manufacture with regard to both materials and labor, and which accordingly is then susceptible of low prices of sale to the consuming public, thereby making such computer monitor organizer assembly economically available to the buying public.

Still yet another object of the present invention is to provide a new computer monitor organizer assembly which provides in the apparatuses and methods of the prior art some of the advantages thereof, while simultaneously overcoming some of the disadvantages normally associated therewith.

Still another object of the present invention is to provide a new computer monitor organizer assembly for organizing information and implements on a panel couplable to a computer monitor.

Yet another object of the present invention is to provide a new computer monitor organizer assembly which includes a panel assembly that has a central opening. The panel assembly is adapted for coupling to a computer monitor such that a display screen of the computer monitor is viewable through the central opening. The panel assembly includes a writing board and an eraser. The panel assembly also includes an eraser holder for coupling the eraser to the panel assembly. There is also a writing implement and writing implement holder for coupling the writing implement to the panel assembly. Also included is a notepad and a paper holding bracket coupled to the panel assembly. The paper holding bracket is adapted for holding a sheet of paper. There is also a corkboard coupled to the panel assembly.

Still yet another object of the present invention is to provide a new computer monitor organizer assembly that helps conserve space around the desk area.

Even still another object of the present invention is to provide a new computer monitor organizer assembly that allows a user to write information on a panel such that the writing is positioned next to the display screen whereby the writing is viewable while using the computer monitor.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
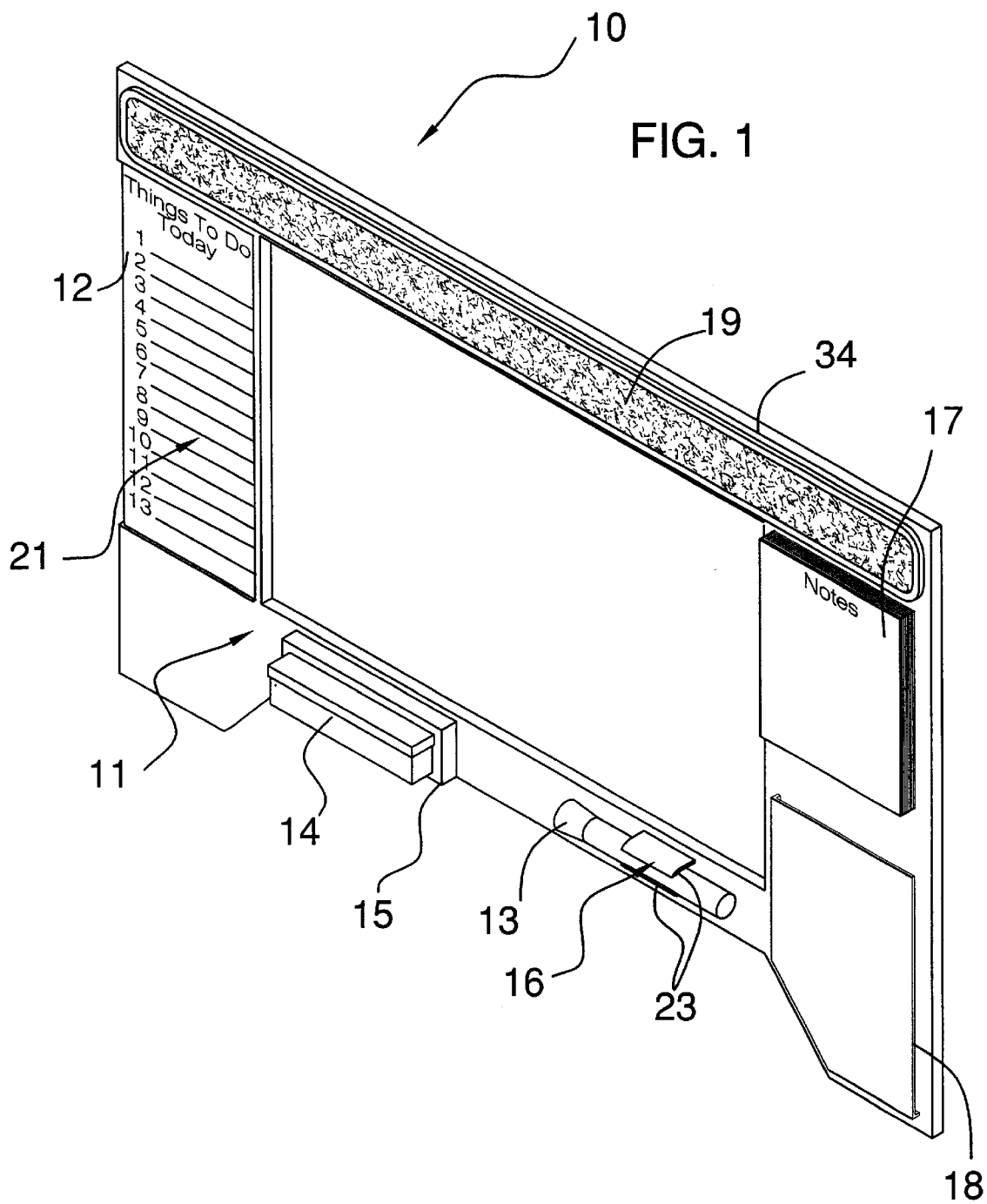
FIG. 1 is a perspective view of a new computer monitor organizer assembly according to the present invention.
Figure 2:
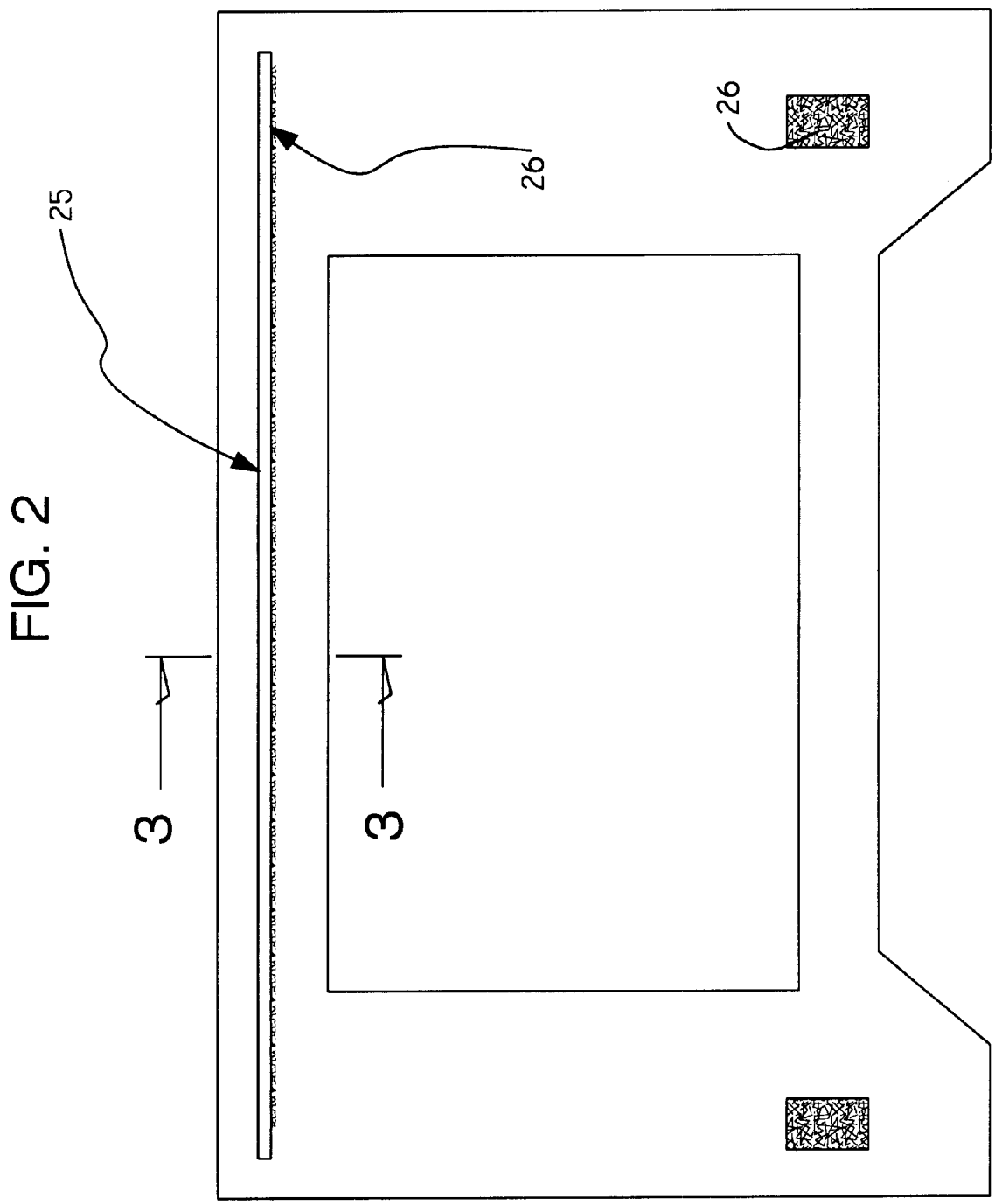
FIG. 2 is a back view of the present invention.
Figure 3:
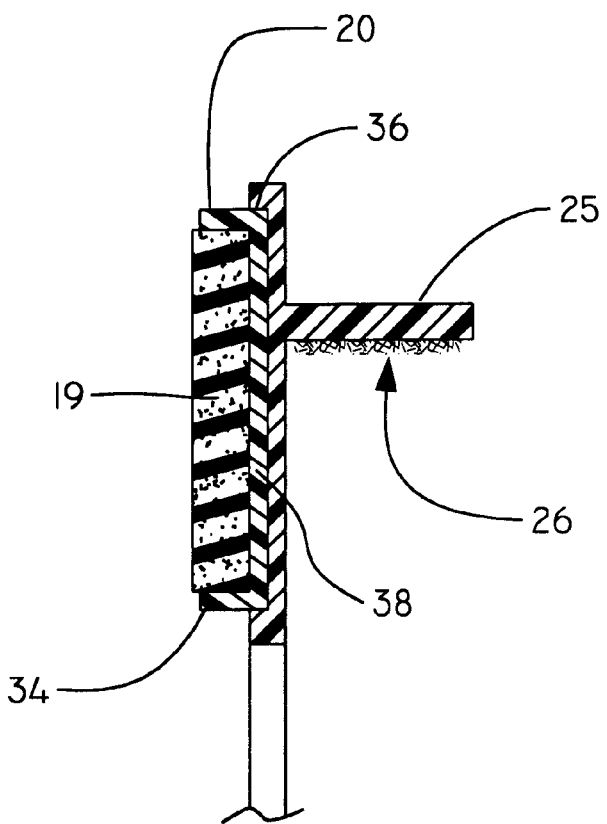
FIG. 3 is a cross section view of the present invention.
Figure 4:
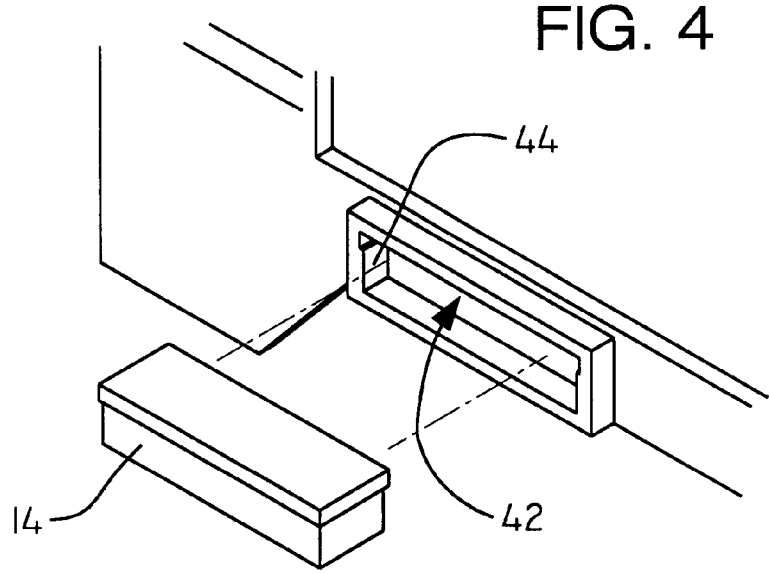
FIG. 4 is a perspective view of the present invention.
Figure 5:
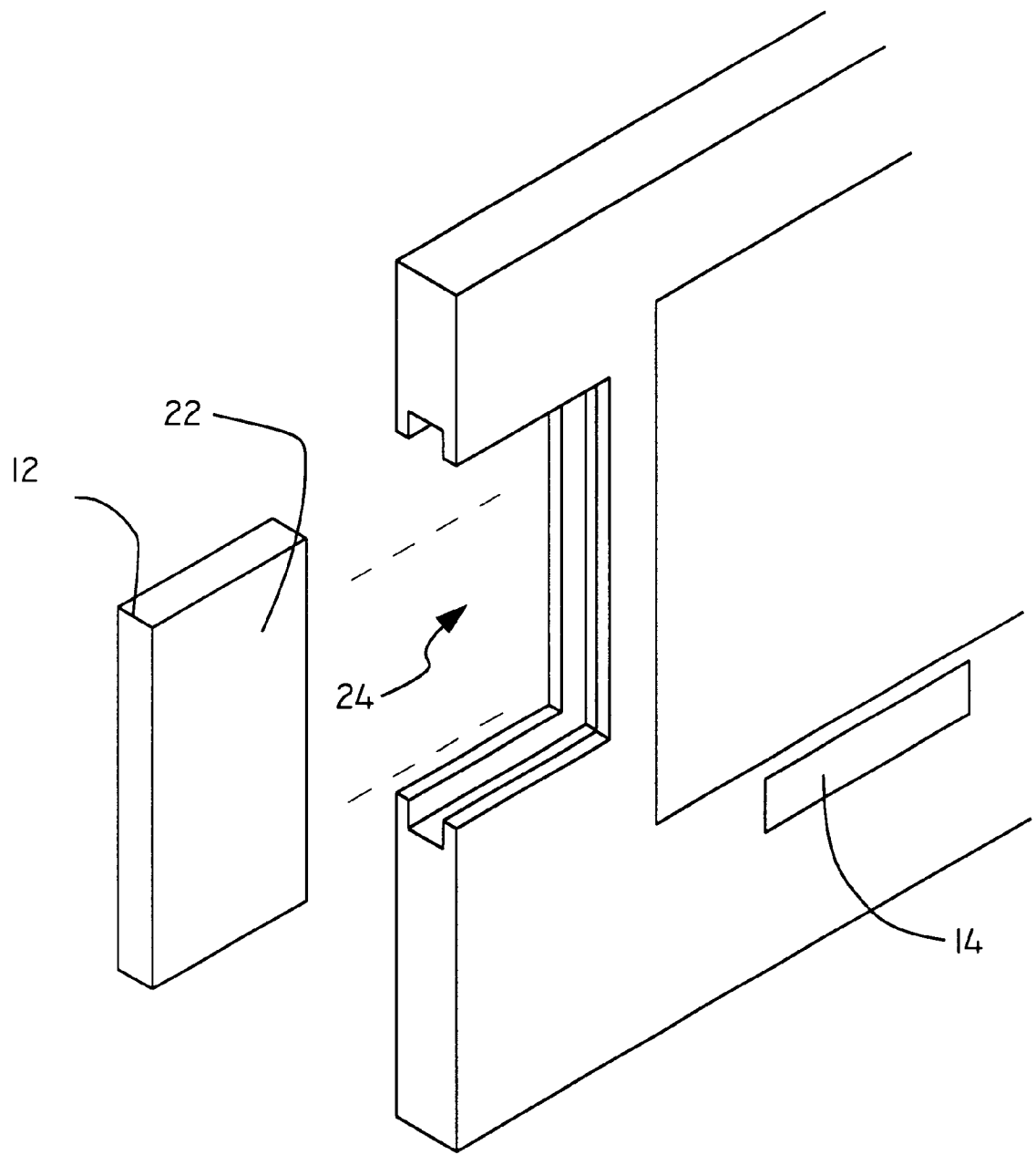
FIG. 5 is a perspective view of the present invention.

With reference now to the drawings, and in particular to FIGS. 1 through 5 thereof, a new computer monitor organizer assembly embodying the principles and concepts of the present invention and generally designated by the reference numeral 10 will be described.

As best illustrated in FIGS. 1 through 5, the computer monitor organizer assembly 10 generally comprises a panel assembly 11 that has a central opening. The panel assembly 11 is for coupling to a computer monitor such that a display screen of the computer monitor is viewable through the central opening.

The panel assembly 11 includes a writing board 12. The writing board 12 is positioned along a left portion of the panel assembly 11.

There includes a writing implement 13 used for marking the writing board 12.

Also included is an eraser 14 for removing marks from the writing board 12.

The panel assembly 11 includes an eraser holder 15 positioned along a lower left portion of the panel assembly 11. The eraser holder 15 is for coupling the eraser 14 to the panel assembly 11 proximate the writing board 12.

The panel assembly 11 includes a writing implement holder 16 positioned along a lower right portion of the panel assembly 11. The writing implement holder 16 is for coupling the writing implement 13 to the panel assembly 11.

Also included is a notepad 17 coupled to the panel assembly 11. The notepad 17 is positioned on an upper right portion of the panel assembly 11.

There also includes a paper holding bracket 18 coupled to the panel assembly 11 on a right portion of the panel assembly 11 below the notepad 17. The paper holding bracket 18 is for holding a sheet of paper from the notepad 17.

Also included is a corkboard 19 coupled to the panel assembly 11. The corkboard 19 is positioned on an upper portion of the panel assembly 11.

There is a corkboard holder 20 coupled to the panel assembly 11. The corkboard holder 20 has a back 38 coupled to the panel assembly 11 and a perimeter wall 34 extending outwardly from a perimeter edge 36 of the back 38. The perimeter wall 34 snugly receives the corkboard 19. Thus, the corkboard 19 is engaged to the panel assembly 11.

The writing board 12 is selectively removable from the panel assembly 11. The writing board 12 has a first face 21 and a second face 22. The writing board 12 is couplable to the panel assembly 11 such that a selectable one of the first face 21 and the second face 22 is positionable to face outwards from the panel assembly 11.

The first face 21 of the writing board 12 has a plurality of spaced lines for facilitating writing of a list on the first face 21 of the writing board 12. The second face 22 of the writing board 12 is blank.

The eraser holder 15 has a depression 42 that has an outer perimeter 44 complimentary to a shape of the eraser 14 for snugly receiving a portion of the eraser 14. Thus, the eraser 14 is engageable to the eraser holder 15.

The writing implement holder 16 comprises a pair of arms 23 extending outwardly from the panel assembly 11. The arms 23 are spaced apart from each other for snugly receiving the writing implement 13 between the arms 23. Thus, the writing implement 13 is engaged to the writing implement holder 16.

Each of the arms 23 is vertically aligned for holding the writing implement 13 in a generally horizontal orientation when the writing implement 13 is engaged to the writing implement holder 16.

The panel assembly 11 has a slot 24 extending inwardly from an edge of the panel assembly 11 for receiving the writing board 12.

The slot 24 has an open front for displaying a selected one of the first face 21 and the second face 22 of the writing board 12.

There is a mounting flange 25 that extends orthogonally outward from a rear face of the panel assembly 11. The mounting flange 25 is for supporting the panel assembly 11 on a top of the computer monitor.

There also includes a first portion of hook and loop fastener 26 coupled to an underside of the mounting flange 25. The mounting flange 25 is for engaging a complimentary portion of hook and loop fastener 26 coupled to the computer monitor for holding the panel assembly 11 in a static position relative to the computer monitor.

In use, place the computer monitor organizer assembly on the front of a computer monitor by complimenting the hook and fastener strips on the backside of the panel assembly and the top of the computer monitor.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the Invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A computer monitor organizing assembly comprising:
   a panel assembly having a central opening, said panel assembly being adapted for coupling to a computer monitor such that a display screen of the computer monitor is viewable through said central opening;
   said panel assembly including a writing board;
   an eraser;
   said panel assembly including an eraser holder, said eraser holder being for coupling said eraser to said panel assembly;
   a writing implement;
   said panel assembly including a writing implement holder, said writing implement holder being for coupling said writing implement to said panel assembly;
   a notepad coupled to said panel assembly;
   a paper holding bracket coupled to said panel assembly, said paper holding bracket being adapted for holding a sheet of paper;
   a corkboard coupled to said panel assembly;
   said writing board being selectively removable from said panel assembly;
   said writing board having a first face and a second face, said writing board being couplable to said panel assembly such that a selectable one of said first face and said second face is positionable to face outwards from said panel assembly
   said panel assembly having a slot extending inwardly from an edge of said panel assembly for receiving said writing board; and
   said slot having an open front for displaying a selected one of said first face and said second face of said writing board.

2. The computer monitor organizing assembly of claim 1, further comprising:
   said first face of said writing board having a plurality of spaced lines for facilitating writing of a list on said first face of said writing board.

3. The computer monitor organizing assembly of claim 2, further comprising:
   said second face of said writing board being blank.

4. The computer monitor organizing assembly of claim 1, further comprising:
   said eraser holder having a depression having an outer perimeter complimentary to a shape of said eraser for snugly receiving a portion of said eraser whereby said eraser is engageable to said eraser holder.

5. The computer monitor organizing assembly of claim 1, further comprising:
   said writing implement holder comprising a pair of arms extending outwardly from said panel assembly, said arms being spaced apart from each other for snugly receiving said writing implement between said arms whereby said writing implement is engaged to said writing implement holder.

6. The computer monitor organizing assembly of claim 5, further comprising:
   each of said arms being vertically aligned for holding said writing implement in a generally horizontal orientation when said writing implement is engaged to said writing implement holder.

7. The computer monitor organizing assembly of claim 1, further comprising:
   a mounting flange extending orthogonally outward from a rear face of said panel assembly, said mounting flange being adapted for being supported on a top of the computer monitor.

8. The computer monitor organizing assembly of claim 7, further comprising:
   a first portion of hook and loop fastener coupled to an underside of said mounting flange whereby said mounting flange is adapted for engaging a complimentary portion of hook and loop fastener coupled to the computer monitor for holding said panel assembly in a static position relative to the computer monitor.

9. The computer monitor organizing assembly of claim 1, further comprising:
   a corkboard holder coupled to said panel assembly, said corkboard holder having a back coupled to said panel assembly and a perimeter wall extending outwardly from a perimeter edge of said back, said perimeter wall snugly receiving said corkboard whereby said corkboard is engaged to said panel assembly.

10. A computer monitor organizing assembly comprising:
    a panel assembly having a central opening, said panel assembly being adapted for coupling to a computer monitor such that a display screen of the computer monitor is viewable through said central opening;
    said panel assembly including a writing board;
    an eraser;
    said panel assembly including an eraser holder, said eraser holder being for coupling said eraser to said panel assembly;
    a writing implement;
    said panel assembly including a writing implement holder, said writing implement holder being for coupling said writing implement to said panel assembly;

a notepad coupled to said panel assembly;

a paper holding bracket coupled to said panel assembly, said paper holding bracket being adapted for holding a sheet of paper;

a corkboard coupled to said panel assembly; and a corkboard holder coupled to said panel assembly, said corkboard holder having a back coupled to said panel assembly and a perimeter wall extending outwardly from a perimeter edge of said back, said perimeter wall snugly receiving said corkboard whereby said corkboard is engaged to said panel assembly.

11. The computer monitor organizing assembly of claim 10, further comprising:

said writing board being selectively removable from said panel assembly.

12. The computer monitor organizing assembly of claim 11, further comprising:

said writing board having a first face and a second face, said writing board being couplable to said panel assembly such that a selectable one of said first face and said second face is positionable to face outwards from said panel assembly.

13. The computer monitor organizing assembly of claim 11, further comprising:

said panel assembly having a slot extending inwardly from an edge of said panel assembly for receiving said writing board;

said slot having an open front for displaying a selected one of said first face and said second face of said writing board.

14. The computer monitor organizing assembly of claim 10, further comprising:

said first face of said writing board having a plurality of spaced lines for facilitating writing of a list on said first face of said writing board.

15. The computer monitor organizing assembly of claim 14, further comprising:

said second face of said writing board being blank.

16. The computer monitor organizing assembly of claim 10, further comprising:

said eraser holder having a depression having an outer perimeter complimentary to a shape of said eraser for snugly receiving a portion of said eraser whereby said eraser is engageable to said eraser holder.

17. The computer monitor organizing assembly of claim 10, further comprising:

said writing implement holder comprising a pair of arms extending outwardly from said panel assembly, said arms being spaced apart from each other for snugly receiving said writing implement between said arms whereby said writing implement is engaged to said writing implement holder.

18. The computer monitor organizing assembly of claim 17, further comprising:

each of said arms being vertically aligned for holding said writing implement in a generally horizontal orientation when said writing implement is engaged to said writing implement holder.

19. The computer monitor organizing assembly of claim 10, further comprising:

a mounting flange extending orthogonally outward from a rear face of said panel assembly, said mounting flange being adapted for being supported on a top of the computer monitor.

20. The computer monitor organizing assembly of claim 19, further comprising:

a first portion of hook and loop fastener coupled to an underside of said mounting flange whereby said mounting flange is adapted for engaging a complimentary portion of hook and loop fastener coupled to the computer monitor for holding said panel assembly in a static position relative to the computer monitor.

21. A computer monitor organizing assembly comprising:

a panel assembly having a central opening, said panel assembly being adapted for coupling to a computer monitor such that a display screen of the computer monitor is viewable through said central opening;

said panel assembly including a writing board, said writing board being positioned along a left portion of said panel assembly;

a writing implement for marking said writing board;

an eraser for removing marks from said writing board;

said panel assembly including an eraser holder positioned along a lower left portion of said panel assembly, said eraser holder being for coupling said eraser to said panel assembly proximate said writing board;

said panel assembly including a writing implement holder positioned along a lower right portion of said panel assembly, said writing implement holder being for coupling said writing implement to said panel assembly;

a notepad coupled to said panel assembly, said notepad being positioned on an upper right portion of said panel assembly;

a paper holding bracket coupled to said panel assembly on a right portion of said panel assembly below said notepad, said paper holding bracket being adapted for holding a sheet of paper from said notepad;

a corkboard coupled to said panel assembly, said corkboard being positioned on an upper portion of said panel assembly;

a corkboard holder coupled to said panel assembly, said corkboard holder having a back coupled to said panel assembly and a perimeter wall extending outwardly from a perimeter edge of said back, said perimeter wall snugly receiving said corkboard whereby said corkboard is engaged to said panel assembly;

said writing board being selectively removable from said panel assembly;

said writing board having a first face and a second face, said writing board being couplable to, said panel assembly such that a selectable one of said first face and said second face is positionable to face outwards from said panel assembly;

said first face of said writing board having a plurality of spaced lines for facilitating writing of a list on said first face of said writing board;

said second face of said writing board being blank;

said eraser holder having a depression having an outer perimeter complimentary to a shape of said eraser for snugly receiving a portion of said eraser whereby said eraser is engageable to said eraser holder;

said writing implement holder comprising a pair of arms extending outwardly from said panel assembly, said arms being spaced apart from each other for snugly receiving said writing implement between said arms whereby said writing implement is engaged to said writing implement holder;

each of said arms being vertically aligned for holding said writing implement in a generally horizontal orientation when said writing implement is engaged to said writing implement holder;

said panel assembly having a slot extending inwardly from an edge of said panel assembly for receiving said writing board;

said slot having an open front for displaying a selected one of said first face and said second face of said writing board;

a mounting flange extending orthogonally outward from a rear face of said panel assembly, said mounting flange being adapted for being supported on a top of the computer monitor; and a first portion of hook and loop fastener, coupled to an underside of said mounting flange whereby said mounting flange is adapted for engaging a complimentary portion of hook and loop fastener coupled to the computer monitor for holding said panel assembly in a static position relative to the computer monitor.

* * * * *